April 18, 1967  H. KÜHNLEIN ET AL  3,315,205
HALL DEVICE WITH IMPROVED ZERO VOLTAGE
TEMPERATURE CHARACTERISTIC
Filed July 6, 1965

3,315,205
HALL DEVICE WITH IMPROVED ZERO VOLTAGE TEMPERATURE CHARACTERISTIC
Hans Kühnlein and Ingeborg Pfreimbter, both of Nurnberg, Germany, assignors to Siemens-Schuckertwerke Aktiengesellschaft, Berlin, Germany, a corporation of Germany
Filed July 6, 1965, Ser. No. 469,760
Claims priority, application Germany, July 8, 1964, S 91,931
2 Claims. (Cl. 338—32)

The present invention relates to a Hall device with an improved zero voltage temperature characteristic. More particularly, the invention relates to a Hall device with a zero voltage temperature characteristic corresponding to the specific resistance temperature characteristic.

In principle, various control and measuring problems could be readily solved with the aid of Hall devices, were it not for the troublesome fact that the temperature characteristic of the zero voltage, or the zero voltage temperature characteristic, often has no definite relation to the magnitude of the zero voltage or to the temperature characteristic of the specific resistance, or the specific resistance temperature characteristic, of the semiconductor material.

The principal object of the present invention is to provide a new and improved Hall device.

An object of the present invention is to provide a Hall device having an improved zero voltage temperature characteristic.

Another object of the present invention is to provide a Hall device with a zero voltage temperature characteristic corresponding to the specific resistance temperature characteristic.

In accordance with the present invention, a Hall device having a zero voltage temperature characteristic comprises an active semiconductor body having a substantially uniform thickness, a length, a width, length sides, spaced opposite ends of the length sides and control electrodes at the spaced opposite ends for providing a control current flow between the control electrodes. The semiconductor body has a specific resistance temperature characteristic. A pair of Hall electrodes extend in opposite directions away from the length sides of the semiconductor body and comprise the same semiconductor material as the semiconductor body. Electrical conductors are soldered to each of the Hall electrodes in positions beyond the sphere of influence of the control current flowing in the semiconductor body so that the zero voltage temperature characteristic corresponds to the specific resistance temperature characteristic of the semiconductor material.

In an embodiment of the present invention, each of the Hall electrodes has at least a portion having a thickness which is at most equal to the thickness of the semiconductor body and each of the Hall electrodes has a width and a length which is at least twice its width so that the ends of the Hall electrodes farthest from the semiconductor body are beyond the sphere of influence of the control current flowing in the semiconductor body.

In an embodiment of the present invention, a swallow-tailed extension extends from the end of each of the Hall electrodes farthest from the semiconductor body, each swallow-tailed extension tapering outwardly from the end of the corresponding Hall electrode and having a thickness greater than that of the semiconductor body, the electrical conductors being soldered to each of the swallow-tailed extensions so that they are in positions beyond the sphere of influence of the control current.

In the embodiment of the present invention, when the control current is substantially sinusoidal and has a non-linear distortion factor $K_n < 10^{-3}$, the zero voltage non-linear distortion factor $K_{on}$ of the Hall device is equal to the control current non-linear distortion factor $K_n$, when $n \geq 3$, $n$ being a harmonic of the fundamental of the zero voltage of the Hall device.

In a modification of the embodiment of the present invention, each of the Hall electrodes has a portion having a thickness which is greater than the thickness of the semiconductor body.

In order that the present invention may be readily carried into effect, it will now be described with reference to the accompanying drawing, wherein.

Figure 1:
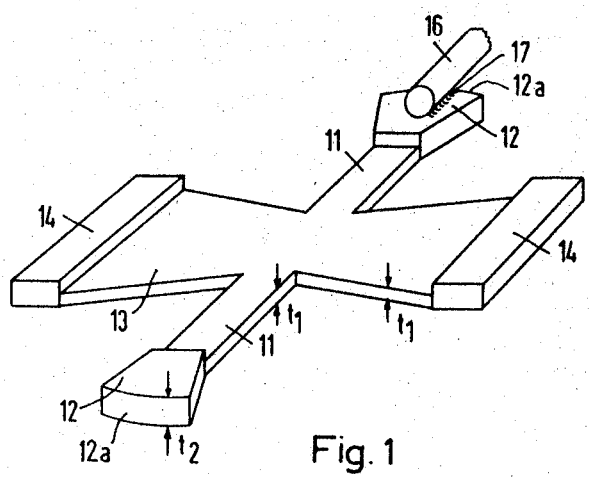
FIG. 1 is a perspective view of an embodimnt of the Hall device of the present invention.

In FIG. 1, Hall electrodes 11 extend from active semiconductor body 13 of the Hall device and are formed of the same semiconductor material as said semiconductor body. The Hall electrodes 11 extend from the central portion of opposite long sides of the active semiconductor body 13 in substantially symmetrical configuration. The electrodes 11 and the semiconductor body 13 have the same thickness $t_1$ of at least a portion of each of said electrodes. The thickness $t_1$ of each of the electrodes 11 may be of lesser magnitude than that of the thickness $t_1$ of the semiconductor body 13 but is not greater in magnitude than the thickness of said semiconductor body. Control electrodes 14 are utilized with the semiconductor body 13.

A swallow-tailed extension 12 extends from the end of each of the electrodes 11 farthest from the other. The thickness $t_2$ of each of the extensions 12 is of greater magnitude than that of the thickness $t_1$. Each of the extensions 12 is of generally trapezoidal configuration tapering outwardly from the electrode 11 in a direction away from the semiconductor body 13. Instead of the outermost edge 12a of the extension 12 forming the larger linear base parallel to the smaller linear base, as in an actual trapezoid, said outermost edge is preferably rounded in configuration, as shown.

The active semiconductor body 13 has a substantially uniform thickness $t_1$, a length extending from one control electrode 14 to the other, a width extending substantially perpendicularly to the length, and length sides. The control electrodes 14 are positioned at spaced opposite ends of the length sides and provide a control current flow between said control electrodes.

The provision of the thickness $t_1$ of the electrodes 11 the same as the thickness $t_1$ of the semiconductor body 13 provides electrical decoupling between the extensions 12 and the control current flowing between the control electrodes 14 of said semiconductor body. That is, the extensions 12 are positioned beyond the sphere of influence of the control current flowing in the semiconductor body 13. The electrical decoupling of the extensions 12 from the control current flowing in the semiconductor body 13 is such that when the control current is sinusoidal and has a non-linear distortion factor $K_n < 10^{-3}$, the non-linear distortion factor of the zero voltage $K_{on}$ is equal to $K_n$ when $n \geq 3$.

The electrical decoupling of the extensions 12 from the control current flowing in the semiconductor body 13, provided by making the thickness of the electrodes 11 the same as or less than the thickness of the semiconductor body 13, is provided in greater degree by making each of said electrodes at least twice as long as it is wide. The length of each electrode 11 is the distance it extends from the semiconductor body 13 and is substantially perpendicular to a line between the control electrodes 14. The width of each electrode 11 is the distance it extends along the semiconductor body 13 and is substantially parallel to a line between the control electrodes 14. The ends of the Hall electrodes 11 are thus positioned beyond the sphere of influence of the control current flowing in the semiconductor body 13. The Hall electrodes 11 may be integrally formed with the active semiconductor body 13, of course.

Figure 2:
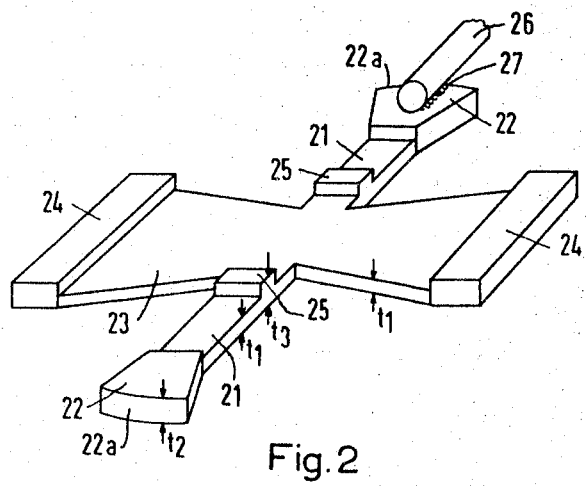
FIG. 2 is a perspective view of a modification of the embodiment of FIG. 1.

The electrical decoupling of the extensions 12 from the control current flowing in the semiconductor body 13 is even further enhanced by providing in each electrode 11 a portion of greater thickness $t_3$ than the thickness of said semiconductor body, as shown in the modification of FIG. 2. In FIG. 2, the Hall electrodes 21 extend from the active semiconductor body 23 of the Hall device and are formed of the same semiconductor material as said semiconductor body. The Hall electrodes 21 extend from opposite long sides of the active semiconductor body 23 in substantially symmetrical configuration. The electrodes 21 and the semiconductor body 23 have the same thickness $t_1$ except for the portion 25 of each of said electrodes which has a thickness $t_3$ of greater magnitude than that of the thickness $t_1$. The portion 25 of each of the electrodes 21 is located in an area intermediate the ends of the corresponding electrode between the semiconductor body 23 and the farthest end of the corresponding electrode from said semiconductor body and is of the same width as the corresponding electrode. Control electrodes 24 are utilized with the semiconductor body 23.

A swallow-tailed extension 22, identical with the extension 12 of FIG. 1, extends from the end of each of the electrodes 21 farthest from the other. Each extension 22 has an outermost edge 22a of rounded configuration. The Hall devices of FIGS. 1 and 2 are identical, except for the portion 25 of each electrode 21 of the Hall device of FIG. 2.

In each of the embodiments of FIG. 1 and the modification of FIG. 2, the Hall electrodes are soldered beyond the sphere of influence of the control current flowing between the control electrodes, due to the length, thickness and extension of the Hall electrodes. Thus, the zero voltage temperature characteristic corresponds to the specific resistance temperature characteristic. In FIG. 1, an electrical conductor 16 is soldered to an extension 12 by solder 17 beyond the sphere of influence of the control current flowing between the control electrodes 14. In FIG. 2, an electrical conductor 26 is soldered to an extension 22 by solder 27 beyond the sphere of influence of the control current flowing between the control electrodes 24.

Figure 3:
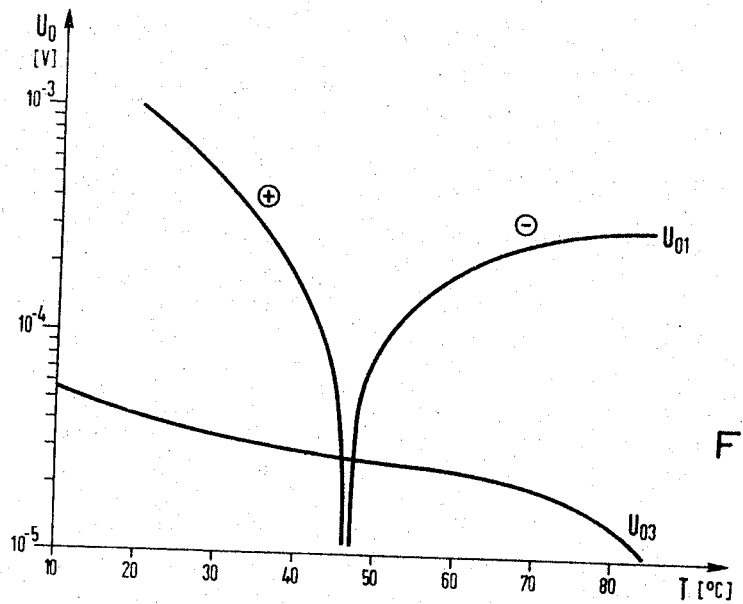
FIG. 3 is a graphical presentation of the zero voltage temperature characteristic of a known type of Hall device.

FIG. 3 illustrates the zero voltage temperature characteristic of a known type of Hall device. In the known type of Hall device, the Hall electrodes are soldered within the sphere of influence of the control current flowing between the control electrodes. In FIG. 3, the abscissa represents temperature T in ° C. and the ordinate represents zero voltage $U_0$ in volts.

In FIG. 3, the curve $U_{01}$ depicts the fundamental of the zero voltage and the curve $U_{03}$ depicts the third harmonic of such fundamental. The fundamental of the zero voltage has a zero magnitude or break at approximately 45° C. The non-linear distortion factor $K_3$ is then about 4% at about 20° C. and is independent of temperature.

Figure 4:
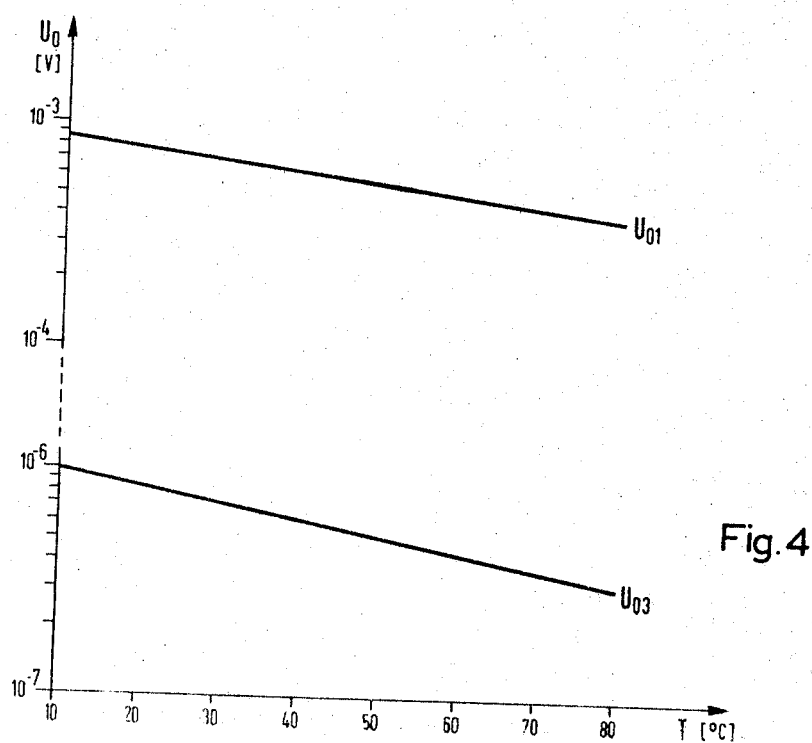
FIG. 4 is a graphical presentation of the zero voltage temperature characteristic of a Hall device of the present invention.

FIG. 4 illustrates the zero voltage temperature characteristic of a Hall device of the present invention, in which the Hall electrodes are soldered beyond the sphere of influence of the control current flowing between the control electrodes so that the zero voltage temperature characteristic corresponds to the specific resistance temperature characteristic. In FIG. 4, the abscissa represents temperature T in ° C. and the ordinate represents zero voltage $U_0$ in volts, as in FIG. 3. In FIG. 4, the curve $U_{01}$ depicts the fundamental of the zero voltage and the curve $U_{03}$ depicts the third harmonic of said fundamental. The fundamental of the zero voltage has a normal temperature characteristic of about $-1.2\%$ per ° C., when the Hall device semiconductor material is InSb. The non-linear distortion factor $K_3$ is then about 1% and is practically independent of temperature.

The curves of FIGS. 3 and 4 indicate that the zero voltage temperature characteristic and the specific resistance temperature characteristic depend upon the semiconductor material utilized, when the non-linear distortion factor $K_3$ of the zero voltage is not greater at room temperature than the non-linear distortion factor of the control current. If the non-linear distortion factor $K_3$ of the zero voltage is greater than the non-linear distortion factor of the control current, the zero voltage temperature characteristic deviates from the theoretical value.

If the exact relationship in a Hall device between the non-linear distortion factor of the zero voltage and the zero voltage temperature characteristic is known, the measurement of the non-linear distortion factor may be utilized to determine the magnitude of the zero voltage temperature characteristic. Measurement of the non-linear distortion factor is especially advantageous for rapid control of the zero voltage temperature characteristic of a Hall device, since no regulated variable temperature is required.

In the Hall device of the present invention, the zero voltage temperature characteristic corresponds to the specific resistance temperature characteristic, dependent upon the semiconductor material utilized. Such correspondence of temperature characteristics enables compensation of the zero voltage independently of temperature. Such compensation may be accomplished by externally connected resistors, for example.

While the invention has been described by means of specific example and in a specific embodiment, we do not wish to be limited thereto, for obvious modifications will occur to those skilled in the art without departing from the spirit and scope of the invention.

We claim:

1. A Hall device having a zero voltage temperature characteristic and a zero voltage non-linear distortion factor $K_{on}$, said Hall device comprising an active semiconductor body having a substantially uniform thickness, a length, a width, length sides, spaced opposite ends of said length sides and control electrodes at said spaced opposite ends for providing a substantially sinusoidal control current flow between said control electrodes, said control current having a non-linear distortion factor $K_n < 10^{-3}$, said semiconductor body comprising semiconductor material having a specific resistance temperature characteristic;

a pair of Hall electrodes extending in opposite directions away from the central portion of the length sides of said semiconductor body, said Hall electrodes comprising the same semiconductor material as said semiconductor body, each of said Hall electrodes having a width and a length which is at least twice its width so that each of said Hall electrodes extends from said semiconductor body to points which are beyond the sphere of influence of the control current flowing in said semiconductor body and the ends of said Hall electrodes farthest from said semiconductor body are beyond said sphere of influence, and each of said Hall electrodes having a portion of greater thickness than the thickness of said semiconductor body in an area intermediate the ends of the corresponding Hall electrode;

a swallow-tailed extension extending from the end of each of said Hall electrodes farthest from said semiconductor body, each said swallow-tailed extension tapering outwardly from the end of the corresponding Hall electrode and having a thickness greater than that of said semiconductor body; and electrical conducting means soldered to each of said swallow-tailed extensions so that they are in positions beyond the sphere of influence of the control current flowing in said semiconductor body so that the zero voltage temperature characteristic corresponds to the specific resistance temperature characteristic of said semiconductor material and said zero voltage non-linear distortion factor $K_{on}$ is equal to said control current non-linear distortion factor $K_n$, when $n \geq 3$, $n$ being a harmonic of the fundamental of the zero voltage of said Hall device.

2. A Hall device as claimed in claim 1, wherein the portion of greater thickness of each of said Hall electrodes is of the same width as the corresponding electrode.

References Cited by the Examiner

UNITED STATES PATENTS

| | | | |
|---|---|---|---|
| 2,553,491 | 5/1951 | Shockley | 317—234 |
| 2,914,728 | 11/1959 | Brophy et al. | 338—32 |
| 2,995,702 | 8/1961 | Lyon | 317—234 |
| 3,046,458 | 7/1962 | Basiago et al. | 317—234 |
| 3,146,317 | 8/1964 | Kuhrt et al. | 324—45 |
| 3,162,932 | 12/1964 | Wood et al. | 338—32 |
| 3,189,762 | 6/1965 | Galpin | 330—6 |
| 3,202,913 | 8/1965 | Marinace | 338—32 |
| 3,239,786 | 3/1966 | Shang | 338—32 |

ANTHONY BARTIS, *Primary Examiner.*

RICHARD M. WOOD, *Examiner.*

W. D. BROOKS, *Assistant Examiner.*